(12) United States Patent
Kytö

(10) Patent No.: US 11,486,090 B2
(45) Date of Patent: Nov. 1, 2022

(54) METHOD AND APPARATUS FOR BURNING ODOR GAS

(71) Applicant: Valmet Technologies Oy, Espoo (FI)

(72) Inventor: Matti Kytö, Tampere (FI)

(73) Assignee: VALMET TECHNOLOGIES OY, Espoo (FI)

( * ) Notice: Subject to any disclaimer, the term of this patent is extended or adjusted under 35 U.S.C. 154(b) by 302 days.

(21) Appl. No.: 16/771,509

(22) PCT Filed: Dec. 13, 2018

(86) PCT No.: PCT/FI2018/050911
§ 371 (c)(1),
(2) Date: Jun. 10, 2020

(87) PCT Pub. No.: WO2019/122510
PCT Pub. Date: Jun. 27, 2019

(65) Prior Publication Data
US 2021/0180250 A1    Jun. 17, 2021

(30) Foreign Application Priority Data
Dec. 22, 2017    (FI) .................................. 20176148

(51) Int. Cl.
*D21C 11/08* (2006.01)
*D21C 7/08* (2006.01)
(Continued)

(52) U.S. Cl.
CPC ............. *D21C 11/08* (2013.01); *D21C 7/08* (2013.01); *F23C 6/045* (2013.01); *F23C 7/06* (2013.01);
(Continued)

(58) Field of Classification Search
CPC .................... F23C 7/06; F23C 6/045
(Continued)

(56) References Cited

U.S. PATENT DOCUMENTS 5,285,628 A * 2/1994 Korenberg ............. F23C 3/006
60/738
5,645,410 A * 7/1997 Brostmeyer ............. F23C 7/06
431/351
(Continued)

FOREIGN PATENT DOCUMENTS

CL    1997-00934 A1    11/1997
CL    2008-002607 A1    9/2009
(Continued)

OTHER PUBLICATIONS

Chinese Office Action for Chinese Patent Application No. 201880083076.1, dated Nov. 9, 2021, (10 pages), China National Intellectual Property Administration, Beijing, China.
(Continued)

*Primary Examiner* — Vivek K Shirsat
(74) *Attorney, Agent, or Firm* — Alston & Bird LLP

(57) ABSTRACT

A method for burning primary fuel (F1), wherein the primary fuel (F1) comprises at least a first compound containing nitrogen and a second compound comprising sulfur. The method comprises producing primary combustion gas (G1) having a temperature of at least 450° C. and comprising oxygen; feeding the primary fuel (F1) and the primary combustion gas (G1) to a primary process zone (Z1) of a furnace (200); feeding tertiary combustion gas (G3) to a secondary process zone (Z2) of the furnace (200); letting the primary fuel (F1), the primary combustion gas (G1), and/or their reaction products to move from the primary process zone (Z1) via the secondary process zone (Z2) to a tertiary process zone (Z3) of the furnace (200); and feeding quaternary combustion gas (G4) comprising oxygen to the tertiary process zone (Z3) of the furnace (200). An embodiment comprises collecting the primary fuel (F1) from a pulp process. A corresponding system.

23 Claims, 6 Drawing Sheets

(51) Int. Cl.
    *F23C 6/04* (2006.01)
    *F23C 7/06* (2006.01)
    *F23G 7/06* (2006.01)

(52) U.S. Cl.
    CPC ............. *F23G 7/063* (2013.01); *F23G 7/065* (2013.01); *F23J 2215/10* (2013.01); *F23J 2215/20* (2013.01)

(58) Field of Classification Search
    USPC .......................................... 431/5, 8, 236, 10
    See application file for complete search history.

(56) References Cited

U.S. PATENT DOCUMENTS

| | | | |
|---|---|---|---|
| 5,823,760 | A | 10/1998 | Shelor et al. |
| 6,030,494 | A | 2/2000 | Hupa et al. |
| 7,249,946 | B2 * | 7/2007 | Martin .................... F23C 6/042 110/212 |
| 7,896,645 | B2 * | 3/2011 | Loving ................... F23C 6/045 431/351 |
| 2011/0280762 | A1 | 11/2011 | Mattelmäki et al. |
| 2012/0247376 | A1 | 10/2012 | Matsumoto et al. |

FOREIGN PATENT DOCUMENTS

| | | |
|---|---|---|
| CL | 2012-000251 A1 | 8/2012 |
| CN | 102980174 A | 3/2013 |
| EP | 2203589 A2 | 7/2010 |
| WO | WO-1982/003111 A1 | 9/1982 |
| WO | WO-97/44620 A1 | 11/1997 |
| WO | WO-99/19668 A1 | 4/1999 |
| WO | WO-1999/019668 A1 | 4/1999 |
| WO | WO-2010/019079 A1 | 2/2010 |

OTHER PUBLICATIONS

Chinese Search Report for for Chinese Patent Application No. 201880083076.1, dated Nov. 9, 2021, (3 pages), China National Intellectual Property Administration, Beijing, China.

Chilean Office Action for Chilean Patent Application No. 2020-001663, dated Feb. 18, 2022, (17 pages), Instituto National de Propiedad Industrial INAPI, Chile.

Finnish Office Action for Patent Application No. 20176148, dated Jul. 13, 2018, (9 pages), Finnish Patent and Registration Office, Tampere, Finland.

International Searching Authority, International Search Report and Written Opinion for Inernational Application No. PCT/FI2018/050911, dated Mar. 14, 2019, (13 pages), European Patent Office, Rijswijk, Netherlands.

* cited by examiner

METHOD AND APPARATUS FOR BURNING ODOR GAS

CROSS REFERENCE TO RELATED APPLICATIONS

This application is a National Stage Application, filed under 35 U.S.C. 371, of International Application No. PCT/FI2018/050911, filed Dec. 13, 2018, which international application claims priority to and the benefit of Finnish Application No. 20176148, filed Dec. 22, 2017; the contents of both of which as are hereby incorporated by reference in their entireties.

BACKGROUND

Related Field

The invention relates to a method and a system for burning fuel that comprises nitrogen and Sulphur such that only a small amount of nitrogen oxides are formed, and the Sulphur is oxidized. The fuel may comprise concentrated odorous gases of a chemical pulp mill. Thus, the invention relates to a method and an apparatus for treating concentrated odorous gases of a chemical pulp mill and/or their condensates, and for improving the control of nitrogen oxide emissions. Moreover, the invention relates to a pulp mill configured to treat odorous gases produced therein.

Description of Related Art

In chemical pulping, wood is treated with cooking liquor, whereby lignin is hydrolyzed. Pulping processes include sulfite and sulfate processes. In the process, several organic sulfur compounds are formed, such as hydrogen sulfide, methylmerkaptan, dimethylsulfide and dimethyldisulfide. These compounds cause the unpleasant smell of vent gases of chemical pulp mills. These gases are formed in several stages of a chemical pulping process, such as at the digester plant and the waste liquor evaporation. Malodorous sulfur compounds are removed most usually by collecting the malodorous gases from various sources and by combusting them either in a lime kiln, a chemical recovery boiler or a separate incinerator. A purpose of combustion is to oxidize sulfur-containing substances to sulfur dioxide and/or sulfur trioxide.

In addition to sulfur compounds, digestion generates also organic hydrocarbons, such as turpentine, in addition to methanol and ammonia. Vapors containing sulfur compounds, ammonia, and methanol are released for instance in waste liquor, e.g. black liquor, evaporation area, where said compounds can be distilled and condensed into condensates. Part of the compounds are non-condensable. Non-condensable gases (NCG) may be combusted together with the flow of other odorous gases of the mill.

The odorous gases are typically divided into strong odor gases (LVHC, Low Volume High Concentration) and dilute odorous gases (HVLC, High Volume Low Concentration). The dilute odorous gases are sometimes referred to as DNCG (i.e. dilute non-condensible gas). Dilute gases are typically collected from atmospheric, i.e. unpressurized, parts of the pulp process. Dilute odorous gases are collected from containers and devices from the fiber line, evaporation plant, tall oil plant and causticizing plant. Dilute odorous gases contain the same components as the strong odorous gases, but they also contain so much air that the concentrations are remarkably lower.

The strong odorous gases are typically collected from some pressurized parts of the pulp process. The strong odorous gases originate mainly from a digester plant, from an evaporation plant, from stripping, from a foul condensate tank, and from a pressurized cooking liquor tank. The strong odor gases may be classified by their origin. CNCG refers to concentrated non-condensible gas collected from the processes other than a stripper, such as an evaporator area and/or a digester area. SOG refers to stripper off gas collected from a stripper. SOG may be condensed to obtain methanol. The present invention relates in particular to combustion of strong odor gases and/or their condensate, i.e. contaminated methanol.

A purpose of combusting odorous gas or contaminated methanol is to oxidize the sulfur compounds contained in the gas or liquid, thereby forming less odorous compounds, such as sulfur dioxide and/or sulfur trioxide. Thus, the combustion takes place in the presence of excess air. However, it has been noticed that in such conditions, the ammonia tends to react with the oxygen of the excess air, thereby forming nitrogen oxides (NOx). For environmental reasons, however, the content of nitrogen oxides should be low. In most countries, the maximum allowable content of NOx is regulated. A method for burning odorous gases with low NOx emissions is disclosed e.g. in the document WO2010/019079. A particularly feasible burner for burning such gases with low-NOx emissions has been disclosed in WO99/19668.

In the burner of prior art, low NOx emissions are achieved by staging the combustion. In a first stage, only a sub-stoichiometric amount of air is used, which reduces the NOx formation. However, it has been noticed, that for running such a process, the temperature within the furnace should remain reasonably stable. This has led to large incinerators with massive brick walls, in order to store heat and in this way regulate the temperature in the incinerator.

In the field of low-NOx combustion, the document U.S. Pat. No. 5,823,760 discloses a steam generator, in which flue gas from diesel engines and air are used as combustion gases.

An object of the present invention is to provide a method that can be performed in a smaller system in which the strong odorous gases and liquids can be burned such that the NOx emissions remain low. An object of the invention is to provide such a system. It may be possible to further reduce the nitrogen oxide emissions of the flue gases of odorous gas combustion.

For achieving these goals the present invention relates to a method and an apparatus for burning primary fuel, wherein the primary fuel comprises at least a compound containing nitrogen, in such a way that the formation of nitrogen oxides is reduced, compared to some prior art combustion methods. The primary fuel may comprise e.g. odorous gas and/or contaminated methanol. More specifically, an object of the present invention is to reduce the size of the incinerator used to burn the odorous gases in such a way that the NOx emissions remain low, and may be even further decreased.

BRIEF SUMMARY

It has been found that by combusting the primary fuel with a primary combustion gas, wherein the primary combustion gas has been preheated to at least 450° C., the primary fuel can be burned in an environment with very low amount of oxygen. The amount of oxygen is determined by the oxygen content of the primary combustion gas and the amount of the primary combustion gas. During combustion, the nitrogen bound in the fuel is released as a free radical and ultimately forms free $N_2$, or NO. When the amount of oxygen is low, the elemental nitrogen or the nitrogen radical tends to form gaseous nitrogen ($N_2$) instead of nitrogen oxides (NOx). Moreover, in the low-oxygen conditions, some of the nitrogen oxides formed in the process may be reduced gaseous nitrogen. In the method, tertiary combustion air is used to provide a transition from the low-oxygen stage to an oxygen-rich stage. In addition, the tertiary combustion air may be used to shape the flame such that less NOx is formed and/or more NOx is being reduced to gaseous nitrogen. Moreover, to ensure sufficiently complete burning, in a later stage, quaternary combustion gas comprising oxygen is fed to the process to complete the combustion, in particular to oxidize Sulphur and other oxidizable compounds of the primary fuel. In some embodiments, the primary fuel refers in particular to strong odorous gases and/or condensed stripper off gas, i.e. contaminated methanol.

The invention is disclosed in more specific terms in the independent claims 1 and 11. The dependent claims disclose preferable embodiments. The description and figures disclose these and other embodiments.

Figure 1:
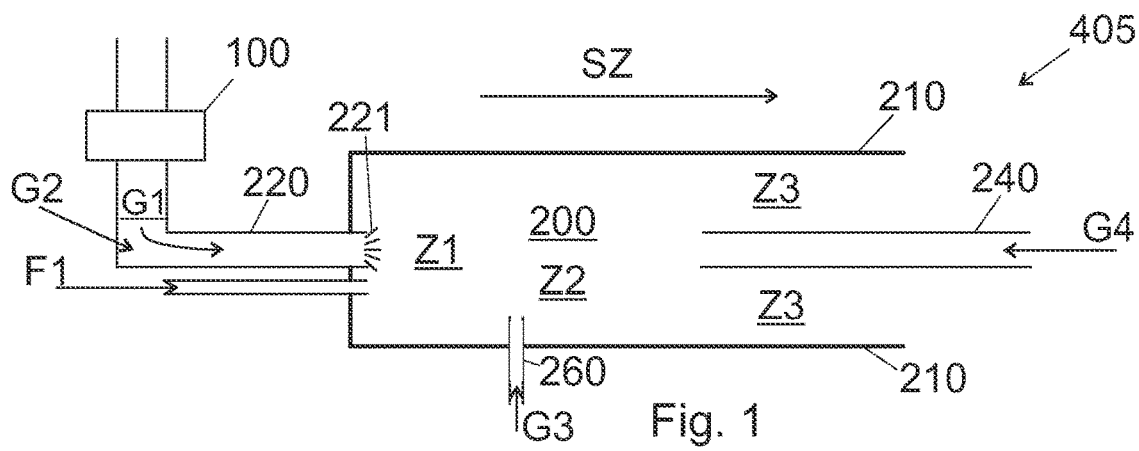
FIG. 1 shows, in a side view, an embodiment of a method for burning nitrogen-containing fuels, and a corresponding apparatus.

In the figures, SZ denotes a longitudinal direction, and SR and SC denote a radial and a circumferential direction, respectively, which all are perpendicular to each other.

DETAILED DESCRIPTION OF VARIOUS EMBODIMENTS

The present invention relates to a method for burning primary fuel F1, wherein the primary fuel F1 comprises at least a first compound containing nitrogen and a second compound comprising Sulphur. For example, strong odorous gases comprise a first compound containing nitrogen and a second compound comprising Sulphur. As indicated in the background, strong odorous gases are produced in sulfate and/or sulfite pulping. These gases comprise compounds comprising Sulphur, which is mainly responsible for the odors. In addition to gases, methanol is produced, and when collected and condensed, the liquid methanol comprises also Sulphur. Such contaminated methanol is also odorous. Still further, these odorous gases or liquids typically comprise nitrogen in the form of ammonia ($NH_3$). Thus, the primary fuel F1 may be gaseous, liquid, or a mixture of gaseous and liquid compounds. The primary fuel F1 may comprise strong odor gas and/or a condensate of strong odor gas. Table 1 indicates three typical compositions of strong odor gases in terms of the main components comprising Sulphur and the main component comprising nitrogen.

TABLE 1 composition of three samples of strong odor gases.

| Compound | | molar wt | content (ppm) | | |
|---|---|---|---|---|---|
| | | | sample 1 | sample 2 | sample 3 |
| hydrogen sufide | $H_2S$ | 34 | | 50000 | 81300 |
| methylmerkaptan | $CH_3SH$ | 48 | 80900 | 110000 | 188300 |
| dimethylsulfide | $(CH_3)_2SH$ | 64 | 22000 | 50000 | 116000 |
| dimethyldisulfide | $(CH_3)_2S_2$ | 94 | 800 | 30000 | 3000 |
| turpentine | $C_{10}H_{16}$ | 132 | 1900 | | |
| methanol | $CH_3OH$ | 32 | | | |
| ammonia | $NH_3$ | 17 | 2000 | 2000 | 2000 |

As motivated above, to remove the odorous compounds, strong odor gases (i.e. odorous gases) or liquids are burned to oxidize the Sulphur. The strong odorous gases or liquids may comprise at least of stripper off gas, non-condensable gas, and methanol. Since these compounds are burned, they are referred to as primary fuel F1 in this description. The method and apparatus may also be applicable for other fuels containing nitrogen and Sulphur. The fuel that is combusted is referred to as primary fuel. Referring to Table 1, in an embodiment, the primary fuel F1 comprises a first compound comprising nitrogen and a second compound comprising Sulphur. The first compound is other than gaseous nitrogen $N_2$. However, the primary fuel F1 may comprise, in addition to gaseous nitrogen, the first compound comprising nitrogen. The first compound may be e.g. ammonia ($NH_3$). The second compound may be e.g. hydrogen sulfide, methyl merkaptan, dimethylsulfide, or dimethydisulphide. In an embodiment, the primary fuel F1 comprises at least 1000 ppm ammonia (on dry basis). Hereinafter the unit ppm refers to parts per million on mass basis, e.g. milligrams per kilograms. Moreover, when measured on dry basis, water is excluded from the measurement. In this embodiment, the primary fuel may comprise at least stripper off gas and/or methanol.

In an embodiment, the primary fuel comprises at least 20000 ppm methylmerkaptan. In this embodiment, the primary fuel may comprise concentrated non-condensible gas collected from the processes other than the stripper and/or stripper of gas or its condensate.

In an embodiment, the primary fuel F1 comprises at least 1000 ppm ammonia (on dry basis) and at least 20000 ppm methylmerkaptan. In this embodiment, the primary fuel may comprise stipper off gas or its condensate. As indicated above, the stipper off gas may be condensed to methanol.

In general, combustion involves high temperatures and presence of oxygen. The high temperature e.g. dissociates the compounds, which thereafter may react with oxygen. However, when multiple molecules containing nitrogen become dissociated to nitrogen atoms or radicals, the nitrogen atoms or radicals may, in the alternative, react with each other. Thus, at a reasonably high temperature and in a reasonably low oxygen content, there is a tendency of the fuels of forming gaseous $N_2$ instead of oxides (NOx). In contrast, in the presence of excess oxygen, there is a tendency of the fuel forming NOx. However, in regular combustion, oxygen needs to be present to such amounts that the temperature remains sufficiently high for oxidation. In general, combustion of fuel takes place with a combustion gas, such as air, the combustion gas comprising oxygen. It has been found that in the presence of a low amount of oxygen, in particular the intermediate reactive compound $NH_2$ tends to react with other compounds, thereby reducing NOx:s. For example, $NH_2$ may react with NO thus producing gaseous nitrogen $N_2$ and water.

Figure 3:
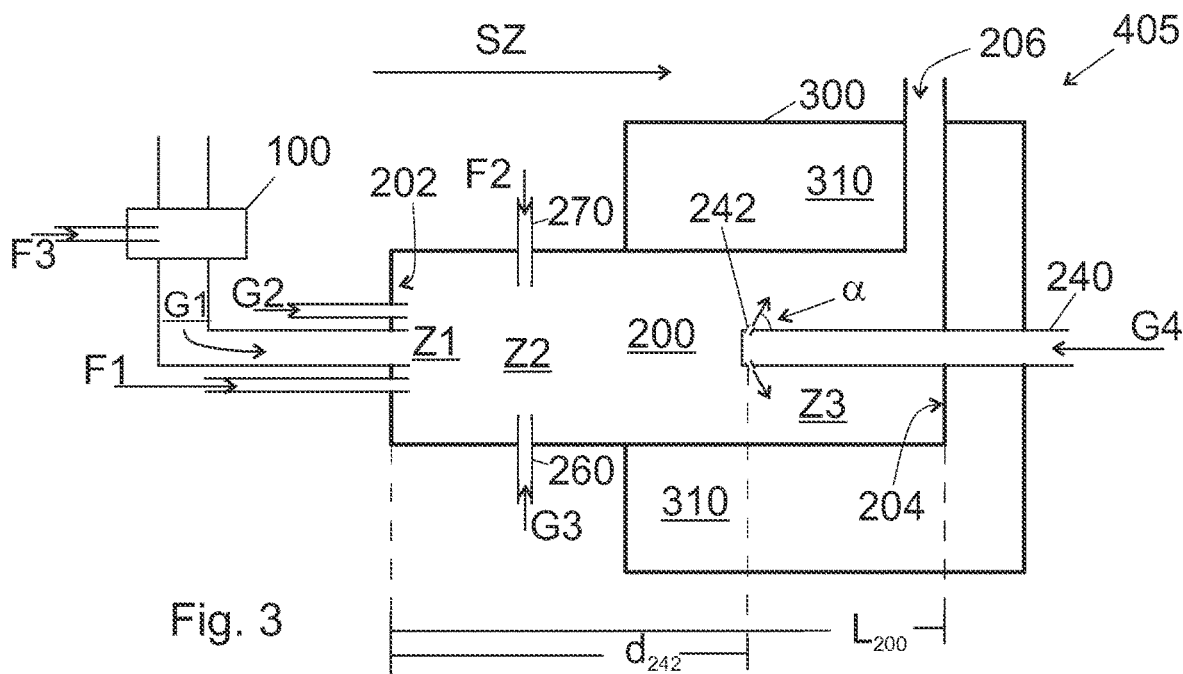
FIG. 3 shows, in a side view, an embodiment of a method for burning nitrogen-containing fuels, and a corresponding apparatus.

An apparatus for the purpose is denoted by the reference numeral 405. Referring to FIG. 1, an apparatus 405 comprises a furnace 200. The furnace is limited by at least a wall 210. The cross section of the furnace 200 may be cylindrical, whereby the furnace 200 is limited by only the wall 210. The cross section of the furnace 200 may have another shape, whereby the furnace would be limited by walls 210. The furnace 200 has a primary process zone Z1, a secondary process zone Z2, and tertiary process zone Z3. The secondary process zone Z2 is arranged in between the primary process zone Z1 and the tertiary process zone Z3. The primary fuel F1 and primary combustion gas G1 are fed to the primary process zone Z1. Referring to FIG. 3, in an embodiment, the primary fuel F1 and primary combustion gas G1 are fed to a primary end 202 of the furnace 200. The compounds will travel from the primary process zone Z1 to the secondary process zone Z2, and further to the tertiary process zone Z3. Thus, the secondary process zone Z2 is arranged in between the primary process zone Z1 and the tertiary process zone Z3 in a direction of a flow of the primary fuel F1 or its combustion products within the furnace 200. The tertiary process zone Z3 may extend in a longitudinal direction SZ to a beginning of a flue gas channel 206 configured to let the combustion products out from the furnace. The flue gas channel 206 may be arranged at a secondary end 204 of the furnace 200.

The furnace 200 has a length $L_{200}$ in its longitudinal direction SZ. Typically, in use, the longitudinal direction SZ is arranged substantially horizontally (e.g. forming an angle of at least 60 degrees with the direction of gravitation of Earth). However, the furnace may be arranged alternatively in another position.

Referring to FIG. 1, one of the features of the invention is to preheat primary combustion gas G1 to a high temperature before it is introduced to the primary process zone Z1. Thus, an embodiment comprises producing primary combustion gas G1 having a temperature of at least 450° C. and comprising oxygen. Moreover, an embodiment comprises a combustion gas heater 100 configured to form primary combustion gas G1 having a temperature of at least 450° C. Still further, the primary combustion gas G1 having the temperature of at least 450° C. is produced before it is introduced into the primary process zone Z1. The apparatus 405 also comprises a primary pipeline 220 for conveying primary combustion gas G1 from the combustion gas heater 100 to the primary process zone Z1 and a first pipeline 230 for conveying primary fuel F1 to the primary process zone Z1. In particular, in an embodiment, the primary combustion gas G1 is fed to the primary process zone Z1 via a primary nozzle 221 such that the temperature of the primary combustion gas G1 in the primary nozzle 221 is at least 450° C. At least a part of the primary nozzle 221 is arranged in the primary process zone Z1.

The temperature of the primary combustion gas G1 needs not be extremely high. Thus, an embodiment comprises producing primary combustion gas G1 having a temperature of at most 700° C. (e.g. at most 650° C.) and comprising oxygen. Moreover, an embodiment comprises a combustion gas heater 100 configured to form primary combustion gas G1 having a temperature of at most 700° C. (e.g. at most 650° C.).

However, the thermal dissociation of nitrogen-comprising compounds may be improved, when the temperature of the primary combustion G1 gas is higher than the aforementioned lower limit. Thus, a preferable embodiment comprises producing primary combustion gas G1 comprising oxygen and having a temperature of at least 500° C. or at least 550° C. An embodiment comprises a combustion gas heater 100 configured to form primary combustion gas G1 having a temperature of at least 500° C. or at least 550° C. Thus, examples of suitable temperature ranges include from 450° C. to 700° C., from 500° C. to 650° C., and from 550° C. to 600° C. As indicated above, these temperatures refer in particular to a temperature in the primary nozzle 221.

Without going into details, it seems that such a temperature is sufficiently high for dissociating the primary fuel F1 within the primary process zone Z1. Thus, the oxygen-content of the primary combustion gas G1 may be low and/or the amount of the primary combustion gas G1 may be low so that the formation of NOx within the primary process zone Z1 is reduced, and correspondingly the formation of $N_2$ is enhanced. Preferably, the oxygen content of the primary combustion gas G1 is less than 20 vol %, such as from 7 vol % to 19 vol %, such as from 15 vol % to 19 vol %. This has the effect that the volume flow of the primary combustion gas G1 can be increased so that the amount of oxygen remains low, whereby the heating of the primary fuel F1 is improved without adding too much oxygen. These values of oxygen content refer, in particular, to the oxygen content of the gas G1 in the primary nozzle 221. Thus, in an embodiment, an oxygen content of the primary combustion gas G1 is within the aforementioned limits before it is fed to the primary process zone Z1.

In order to produce only a small amount of nitrogen oxides, the primary fuel F1 and the primary combustion gas G1 are fed to the furnace 200 in such a way that the primary combustion gas G1 contains less oxygen than a complete combustion of the primary fuel F1 would require. Typical values of an air-fuel equivalence ratio λ are given below.

Figure 2:
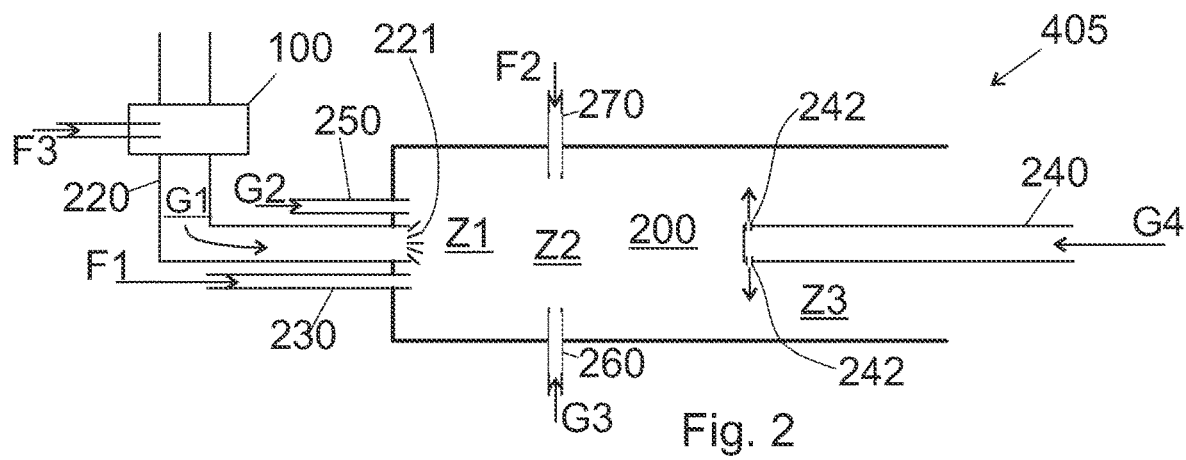
FIG. 2 shows, in a side view, an embodiment of a method for burning nitrogen-containing fuels, and a corresponding apparatus.
Figure 4A:
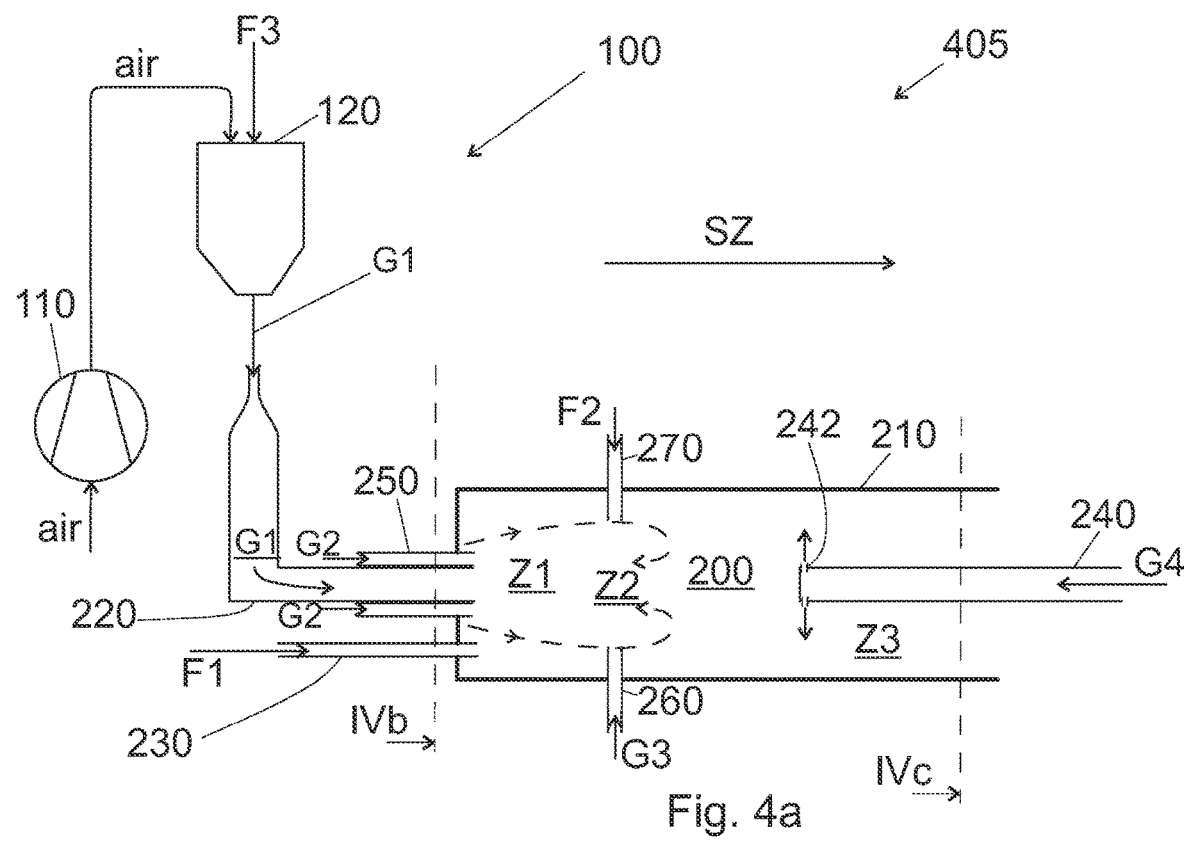
FIG. 4a shows, in a side view, an embodiment of a method for burning nitrogen-containing fuels, and a corresponding apparatus.

The primary combustion gas G1 may comprise air and/or dilute odorous gases (HVLC, High Volume Low Concentration). If the primary combustion gas G1 is heated by burning some tertiary fuel F3, e.g. other fuel, air and/or dilute odorous gases may be used for burning the tertiary fuel F3. Such an embodiment is shown in FIGS. 2, 3, and 4a.

In order to start the combustion process, an igniter, i.e. a starter, may be provided in the furnace 200 (not shown). The igniter may be provided at the first end 202. The igniter may function e.g. with suitable gaseous fuel, such as natural gas or liquid propane gas.

In order to control the combustion process in the furnace 200, an embodiment comprises feeding tertiary combustion gas G3 to the secondary process zone Z2 of the furnace 200. The tertiary combustion gas G3 may be used to shape the flame such that less NOx is formed and/or more NOx is being reduced to gaseous nitrogen. The tertiary combustion gas G3 may comprise air and/or dilute odorous gases (HVLC, High Volume Low Concentration). Correspondingly, an embodiment comprises a tertiary pipeline 260 for conveying tertiary combustion gas G3 to the secondary process zone Z2.

Air and/or dilute odorous gases may be used as the tertiary combustion gas G3. In an embodiment, an oxygen content of the tertiary combustion gas G3 is greater than 20 vol %. In an embodiment, an oxygen content of the tertiary combustion gas G3 is greater than an oxygen content of the primary combustion gas G1. The oxygen content of the tertiary combustion gas G3 refers to an oxygen content within the tertiary pipeline 260. The oxygen content of the primary combustion gas G1 refers to an oxygen content at a primary nozzle 221. In an embodiment, an oxygen content of the tertiary combustion gas G3, before it (i.e. G3) is fed to the secondary process zone Z2, is higher than an oxygen content of the primary combustion gas G1, before it (i.e. G1) is fed to the primary process zone Z1.

As indicated above, in order to oxidize the Sulphur of the primary fuel F1, at some point the oxygen content should be high. Thus, in an embodiment, the primary fuel F1, the primary combustion gas G1, or their reaction products are let to move to the tertiary process zone Z3 of the furnace 200. Moreover, quaternary combustion gas G4 comprising oxygen is fed to the tertiary process zone Z3 of the furnace 200. Thus an embodiment comprises a quaternary pipeline 240 for conveying quaternary combustion gas G4 to the tertiary process zone Z3.

The quaternary combustion gas G4 is used primarily to finish the combustion, e.g. by oxidizing the Sulphur and other combustible compounds of the primary fuel F1. In an embodiment, the quaternary combustion gas G4 comprises more than 20 vol % oxygen. Preferably, an oxygen content of the quaternary combustion gas G4 is higher than an oxygen content of the primary combustion gas G1. The oxygen content of the quaternary combustion gas G4 refers to an oxygen content at a tertiary nozzle 242. The oxygen content of the primary combustion gas G1 refers to an oxygen content at a primary nozzle 221. In an embodiment, an oxygen content of the quaternary combustion gas G4, before it (i.e. G4) is fed to the tertiary process zone Z3, is higher than an oxygen content of the primary combustion gas G1, before it (i.e. G1) is fed to the primary process zone Z1. The quaternary combustion gas G4 may comprise air and/or dilute odorous gases (HVLC, High Volume Low Concentration).

Referring to FIG. 2, an embodiment comprises tertiary nozzles 242 connected to the quaternary pipeline 240 such that the tertiary nozzles 242 are configured to feed the quaternary combustion gas G4 to the tertiary process zone Z3. Preferably the tertiary nozzles 242 are configured to feed the quaternary combustion gas G4 in a direction that forms an angle α (see FIG. 3) of from 15 to 135 degrees with the longitudinal direction SZ, which is directed from the primary end 202 of the furnace 200, to which the primary fuel F1 is fed, to a secondary end 204 of the furnace 200. Preferably, the angle α (see FIG. 3) is from 30 to 120 degrees. The direction to which the tertiary nozzles 242 are configured to feed the quaternary combustion gas G4 may be e.g. substantially radial. This has been found to improve mixing of the quaternary combustion gas G4 with the other compounds in the tertiary process zone Z3. Moreover, not feeding the quaternary combustion gas G4 towards the primary process zone Z1 has the effect that the oxygen content remains low in the primary process zone Z1.

In order to have proper reaction times within the primary process zone Z1 and the tertiary process zone Z3, at least one of the tertiary nozzles 242 is arranged, in the longitudinal direction SZ, substantially in the center of the furnace 200. Referring to FIG. 3, a length of the furnace 200, in the longitudinal direction SZ, is denoted by $L_{200}$. Moreover, the primary combustion gas G1 is fed to a primary end 202 of the furnace 200. The combustion products flow towards a secondary end 204 of the furnace 200. Moreover, from the secondary end 204, the combustion products exit through a flue gas channel 206. Correspondingly, the length $L_{200}$ is left in between the primary end 202 and the secondary end 204. At least one of the tertiary nozzles 242 configured to feed the quaternary combustion gas G4 to the tertiary process zone Z3 is arranged at a distance $d_{242}$ from the primary end 202 (see FIG. 3). That tertiary nozzle 242 is close to the center of the furnace 200 in the longitudinal direction SZ in order have the aforementioned proper reaction times. More specifically, in an embodiment, the ratio $d_{242}/L_{200}$ is from 0.25 to 0.75, preferably from 0.35 to 0.65.

In addition, the diameter $D_{240}$ of the quaternary pipeline 240 has been found to affect the combustion in the tertiary process zone Z3. Referring to FIG. 4c, in an embodiment, the cross section of the furnace 200 on a plane having a normal in the longitudinal direction SZ is substantially circular with an inner diameter $D_{210}$. Moreover, the cross section of the quaternary pipeline 240 on a plane having a normal in the longitudinal direction SZ is substantially circular with an outer diameter $D_{240}$. The quaternary pipeline 240 is preferably dimensioned such that a ratio $D_{240}/D_{210}$ of the outer diameter $D_{240}$ of the quaternary pipeline 240 to the inner diameter $D_{210}$ of the furnace 200 is from 0.1 to 0.5, such as from 0.2 to 0.4. Moreover, in an embodiment, the furnace 200 and the quaternary pipeline 240 are coaxial.

In an embodiment, the quaternary combustion gas G4 is fed through the tertiary nozzles 242 in such a way that a flow velocity of the quaternary combustion gas G4, at an outlet of a tertiary nozzle 242 is from 50 m/s to 80 m/s. This has been found to provide for sufficient mixing of the quaternary combustion gas G4 with the intermediate combustion products.

Referring to FIG. 2, depending on the type and amount of the primary fuel F1, there may be a need to use also secondary combustion gas G2 in the primary process zone Z1. Air, dilute odorous gases, or their mixture may be used as the secondary combustion gas G2. An embodiment comprises feeding secondary combustion gas G2 to the primary process zone Z1 of the furnace 200. Preferably, an oxygen content of the secondary combustion gas G2 is higher than an oxygen content of the primary combustion gas G1. Correspondingly, an embodiment comprises a secondary pipeline 250 for conveying secondary combustion gas G2 to the primary process zone Z1. The oxygen content of the secondary combustion gas G2 refers to the oxygen content of the secondary combustion gas G2 within the secondary pipeline 250. The oxygen content of the primary combustion gas G1 refers to an oxygen content at a primary nozzle 221. In an embodiment, an oxygen content of the secondary combustion gas G2, before it (i.e. G2) is fed to the primary process zone Z1, is higher than an oxygen content of the primary combustion gas G1, before it (i.e. G1) is fed to the primary process zone Z1. Referring to FIG. 1, the secondary combustion gas G2 may be mixed with the primary combustion gas G1 already before the furnace 200; at least provided that the mixture has a suitably high temperature, as discussed above. Moreover, the secondary combustion gas G2 is not necessarily needed.

Burning the primary fuel F1 in the furnace 200 generates heat. Preferably the heat is recovered for other purposes. Moreover, recovering heat helps to keep the process conditions within the furnace 200 stable, which helps to maintain the process conditions for low-NOx combustion. To keep the apparatus small, heat is recovered preferably in such a way that the furnace 200 forms a fire tube boiler. Correspondingly, the furnace 200 is surrounded by at least a wall 210. Moreover, at least a part of the wall 210 is arranged in a container 300 at least partially filled with liquid heat transfer medium 310 such as oil or water. Moreover, the wall 210 comprises metal. In an embodiment, only metal is left in between the furnace 200 and the liquid heat transfer medium 310 of the container 300. Thus, heat is effectively transferred via the wall 210 from the furnace 200 to the liquid heat transfer medium 310. Correspondingly, an embodiment comprises a vessel 300 for storing liquid heat transfer medium, such that at least part of the wall 210 of the furnace 200 is arranged inside the vessel 300. In some cases it may suffice that the wall 210 comprises metal, and the wall 210 is cooled from the exterior e.g. by convection to air. However, in such cases heat is typically not recovered.

As indicated above, the primary fuel F1 is burned in a first stage corresponding to the primary process zone Z1, in a second stage corresponding to the second process zone Z2, and in a third stage corresponding to the tertiary process zone Z3.

Typically the odorous gases and liquids are not all of the same type. In general, the gases may be classified as strong or dilute, as indicated in the background. Moreover, strong odorous gases include two types of strong odorous gases: stripper off gas (SOG, optionally condensed to methanol) and concentrated non-condensible gas (CNCG). Some of the odorous gases may contain more nitrogen than others. For example, as for the strong odorous gases or their condensates, SOG contains more nitrogen than CNCG. It has been observed that the NOx emissions can be particularly well reduced, if a nitrogen-rich part is combusted in all the process zones including the primary process zone Z1, and a nitrogen-poor part is combusted only in a second and subsequent process zones Z2 and Z3. Not feeding the nitrogen-poor (e.g. CNCG) part to the primary process zone Z1 has the effect of increasing the capacity of the apparatus, which helps to keep the apparatus small for a designed throughput.

Therefore, an embodiment comprises feeding secondary fuel F2 to the secondary process zone Z2 of the furnace 200. As indicated in connection with FIG. 1, the secondary process zone Z2 is arranged in between the primary process zone Z1 and the tertiary process zone Z3. Referring to FIG. 2, a corresponding embodiment comprises a second pipeline 270 for conveying secondary fuel F2 to the secondary process zone Z2.

In an embodiment, also the secondary fuel F2 comprises at least a compound containing nitrogen and another compound comprising sulfur. As indicated above, in a preferable embodiment, the secondary fuel F2 comprises at least a compound containing nitrogen such that a nitrogen content of the secondary fuel F2 is less than a nitrogen content of the primary fuel F1. In an embodiment, the secondary fuel F2 comprises ammonia. In an embodiment, both the primary fuel F1 and the secondary fuel F2 comprise ammonia such that the secondary fuel F2 comprises less ammonia than the primary fuel F1 (in terms of the content of the fuels F1 and F2). As indicated above, the secondary fuel F2 further comprises a compound comprising Sulphur.

As an example, the primary fuel F1 may comprise one of methanol and stripper off gas as collected from a pulp process. As an example, the secondary fuel F2 may comprise concentrated non-condensable gas as collected from a pulp process. As an example, the primary fuel F1 may consist of methanol, stripper off gas, or their mixture as collected from a pulp process. As an example, the secondary fuel F2 may consist of concentrated non-condensable gas (e.g. CNCG) as collected from a pulp process. In an embodiment, the primary fuel F1 comprises Sulphur. In an embodiment, the secondary fuel F2 comprises Sulphur. In an embodiment, the primary fuel F1 comprises at least 1000 ppm ammonia (on dry basis) and at least 20000 ppm methylmerkaptan, and the secondary fuel F2 comprises ammonia and at least 20000 ppm methylmerkaptan, and the content of ammonia of the secondary fuel F2 is less than the content of ammonia of the primary fuel F1. An embodiment comprises collecting the primary fuel F1 from a pulp process. An embodiment comprises collecting the secondary fuel F2 from a pulp process. It is also possible to use the dilute odor gas (HVLC) as the secondary fuel F2.

However, it is possible to use the apparatus for burning only CNCG as the primary fuel F1. Moreover, it is possible to use the apparatus for burning only SOG and/or a condensate thereof as the primary fuel F1.

In general, a combustion process condition can be described by an air-fuel equivalence ratio, commonly denoted by $\lambda$. The air-fuel equivalence ratio $\lambda$ describes the proportional amount of oxygen fed to combustion process. The proportion is normalized such that the air-fuel equivalence ratio $\lambda$ equals 1, when the amount of oxygen fed to the process with combustion gases (e.g. G1, G2) equals the stoichiometric amount of oxygen required by the fuel (e.g. F1) to completely burn. Thus, when the air-fuel equivalence ratio $\lambda$ equals 1, the combustion is referred to as stoichiometric combustion. Stoichiometric combustion occurs when all the oxygen is consumed in the reaction, and there is no molecular oxygen ($O_2$) in the products.

For reasons indicated above, the oxygen content in the primary process zone Z1 is preferable low. Thus, in an embodiment, the air-fuel equivalence ratio $\lambda$ in the primary process zone Z1 is low. An embodiment comprises controlling an amount of the primary combustion gas G1 and the primary fuel F1 in such a way that the air-fuel equivalence ratio $\lambda$ in the primary process zone Z1 is at most 0.95, such as from 0.4 to 0.95, such as from 0.5 to 0.95; preferably the air-fuel equivalence ratio $\lambda$ in the primary process zone Z1 is less than 0.8, such as at least 0.4 but less than 0.8, or at least 0.5 but less than 0.8. It has been observed that with such a low amount of oxygen, the nitrogen tends not to form NOx, but prefers the formation of $N_2$ instead. Moreover, the chemical reactions in such a low amount of oxygen also help to reduce at least some of the NOx:s, which form to some extent, to gaseous nitrogen $N_2$.

As indicated above, a purpose of subsequent combustion stages is to oxidize the Sulphur. Another purpose is to burn hydro carbons of the primary fuel F1 (and, optionally, of the secondary fuel F2). Thus, the air-fuel equivalence ratio $\lambda$ in the tertiary process zone Z3 is preferably high. For these reasons, an embodiment comprises controlling an amount of the quaternary combustion gas G4 in such a way that an air-fuel equivalence ratio $\lambda$ in the tertiary process zone Z3 is more than 1.1, such as from 1.1 to 2, such as from 1.2 to 1.5.

As indicated above, also some tertiary combustion gas G3 is fed to the process. Thus, an embodiment comprises controlling an amount of the tertiary combustion gas G3 in such a way that an air-fuel equivalence ratio λ in the secondary process zone Z2 is from 0.7 to 1.05.

The quaternary combustion gas G4 may be supplied in such an amount that the flue gas expelled from the furnace 200 comprises oxygen (O2). The oxygen content of the flue gas may be measured e.g. from the flue gas channel 206, e.g. after the a fan or a pump 407, if such is used. The oxygen content of the flue gas may be e.g. at least 1 vol-%, such as at least 2 vol-%.

Some subsequent process steps may require a more significant amount of oxygen. Thus, the quaternary combustion gas G4 may be supplied in such an amount that the flue gas expelled from the furnace 200 comprises more than 5 vol-% oxygen (O2). Examples of processes requiring oxygen include catalytic conversion of a compound of the flue gas, e.g. catalytic oxidation of $SO_2$ to $SO_3$.

As is clear, the air-fuel equivalence ratio is not spatially constant. Thus the values given above apply on average. For example, when the wall 210 limits the furnace, and the combustion products move in a certain direction in the furnace, the amount of fuel (or fuels) and combustion gases fed to the process before any point of observation is known. Correspondingly, the air-fuel equivalence ratio can be calculated for any point of observation.

Figure 5A:
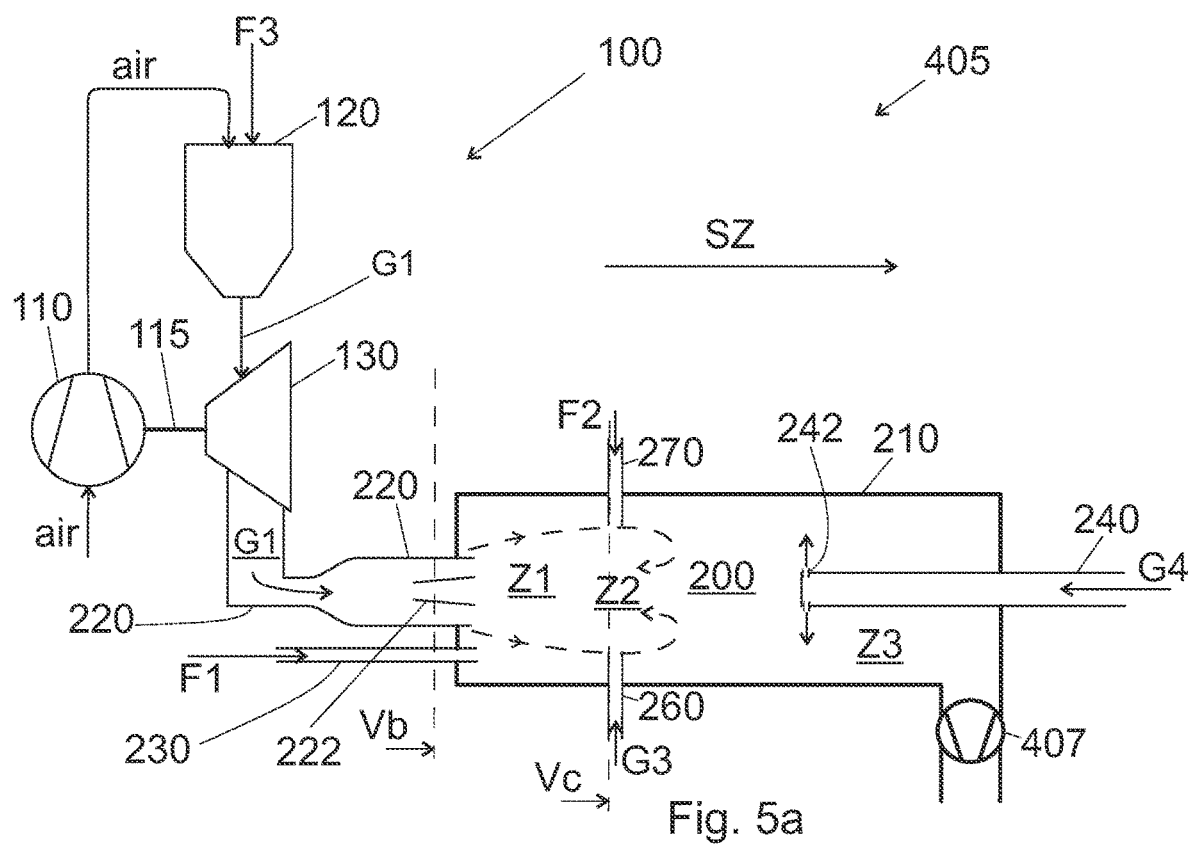
FIG. 5b shows, in an end view, the section Vb of FIG. 5a, FIG. 5c shows, in an end view, the section Vc of FIG. 5a, FIG. 6a shows, in a side view, an embodiment of a method for burning nitrogen-containing fuels, and a corresponding apparatus.

The primary combustion gas G1 may be heated with suitable means. For example, a fan 110 and a heat exchanger could be used to produce hot primary combustion gas G1. For example, a fan 110 and an electrical heater could be used to produce hot primary combustion gas G1. However, it has been found that a hot gas generator based on combusting tertiary fuel F3 is particularly suitable for the purpose. Such a gas generator is shown in FIGS. 4a and 5a. The combustion gas heater 100 (i.e. the gas generator) comprises a compressor 110 (or a fan 110). The compressor 110 feeds air and/or dilute odorous gases to a secondary furnace 120, wherein a small amount of tertiary fuel F3 is burned. The small amount refers to super-stoichiometric process conditions, whereby the gas generated in the secondary furnace 120 still contain at least 15 vol % oxygen, typically from 16 vol % to 19 vol % oxygen. The tertiary fuel F3 may comprise e.g. natural gas, fuel oil (heavy or light), or liquid propane gas. These fuels are particularly suitable, if very low levels of NOx emissions are required. Air and/or dilute odorous gases can be fed to the secondary furnace 120 by the fan or compressor 110 to burn the tertiary fuel F3.

In FIG. 5a, the compressor 110 or fan 110 is connected with a shaft 115 to a turbine 130. Upon burning the tertiary fuel F3, the turbine 130 provides the mechanical energy to the compressor 110 via the shaft 115. The tertiary fuel may be fed in such a way that it does not completely burn, whereby some of the unburned tertiary fuel may be conveyed to the primary process zone Z1 of the furnace 200 with the primary combustion gas G1. In the embodiment of FIG. 5a, the primary pipeline 220 is configured to convey at least the primary combustion gas from the turbine 130 to the primary process zone Z1.

As a substitute for natural gas or fuel oil, the tertiary fuel F3 may comprise methanol, as collected from a pulp process, e.g. by condensing the stripper off gas, SOG. As indicated above, such methanol may comprise a considerable amount of nitrogen in the form of ammonia. Thus, when used as the tertiary fuel F3, some NOx would be produced in the secondary furnace 120. However, as indicated above, the low-oxygen conditions in the primary zone Z1 of the furnace 200 may provide for sufficient reduction of those NOx:s to gaseous nitrogen, whereby the NOx emissions from the furnace 200 might still be in an acceptable level.

By using the compressor 110 or the fan 110 for gas (air and/or dilute odorous gases), also the primary combustion gas G1 before the nozzles 221 (see FIG. 1), e.g. after the turbine 130, may be slightly pressurized. For example, the overpressure of the primary combustion gas G1 within the primary pipeline 220 may be from 0.01 bar to 0.5 bar. This has the effect that the combustion process, in particular the air-fuel equivalence ratio can be more easily controlled. In an embodiment, The pressure in the primary pipeline 220 corresponds to an overpressure of from 0.01 bar to 0.5 bar. The term overpressure refers to a pressure difference relative to ambient.

As indicated above, an embodiment comprises producing the primary combustion gas G1 by burning a tertiary fuel F3 with air and/or dilute odorous gases thereby producing the primary combustion gas G1 as the product of that combustion. The embodiment further comprises delivering the primary combustion gas G1 to the primary process zone Z1 by means of a compressor 110 or a fan 110. Correspondingly, an embodiment comprises a secondary furnace 120 configured to burn tertiary fuel F3 to produce the primary combustion gas G1, and a compressor 110 or a fan 110 configured to drive primary combustion gas G1 to the furnace 200. The embodiment of FIG. 5a further comprises a turbine 130 configured to provide mechanical energy to the compressor 110 or the fan 110.

Figure 4B:
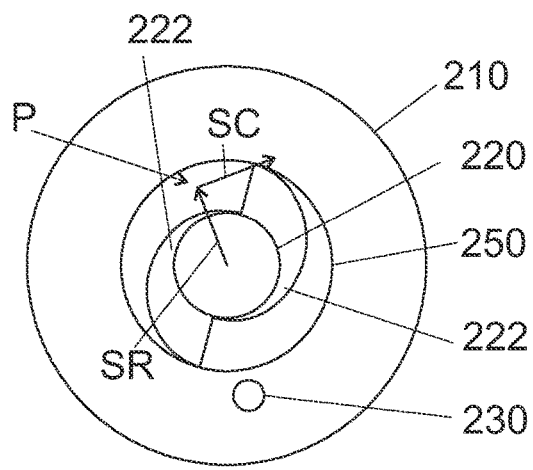
FIG. 4b shows, in an end view, the section IVb of FIG. 4a, FIG. 4c shows, in an end view, the section IVc of FIG. 4a, FIG. 5a shows, in a side view, an embodiment of a method for burning nitrogen-containing fuels, and a corresponding apparatus.
Figure 4C:
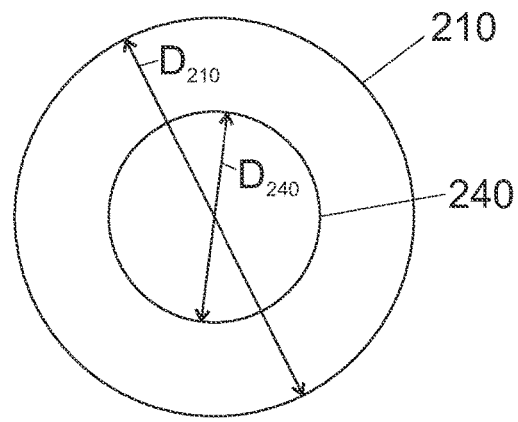

Referring to FIGS. 4a to 4c, in an embodiment, the wall 210 of the furnace 200 has a shape of a cylinder. Correspondingly, a cross section of the furnace in a plane having a normal that is parallel to the direction SZ of length is circular. Such a cross section is shown in FIG. 4c. In general, a point P that is not on the central axis AX of the furnace 200 defines a radial direction SR, as indicated in FIG. 4b.

Referring to FIG. 4b, in an embodiment, the apparatus 405 comprises a guide element 222 configured to guide a gas flow into the primary process zone Z1 such that the direction of the gas flow within the primary process zone has a non-zero (i.e. positive or negative) component in a direction that is perpendicular to the longitudinal direction SZ and perpendicular to the radial direction SR. More precisely, the guide element 222 is configured to guide the gas flow such that the direction of the flow of the gas within the primary process zone at a point P has a component that is perpendicular to the longitudinal direction SZ and perpendicular to the radial direction SR at the point P.

Figure 6A:
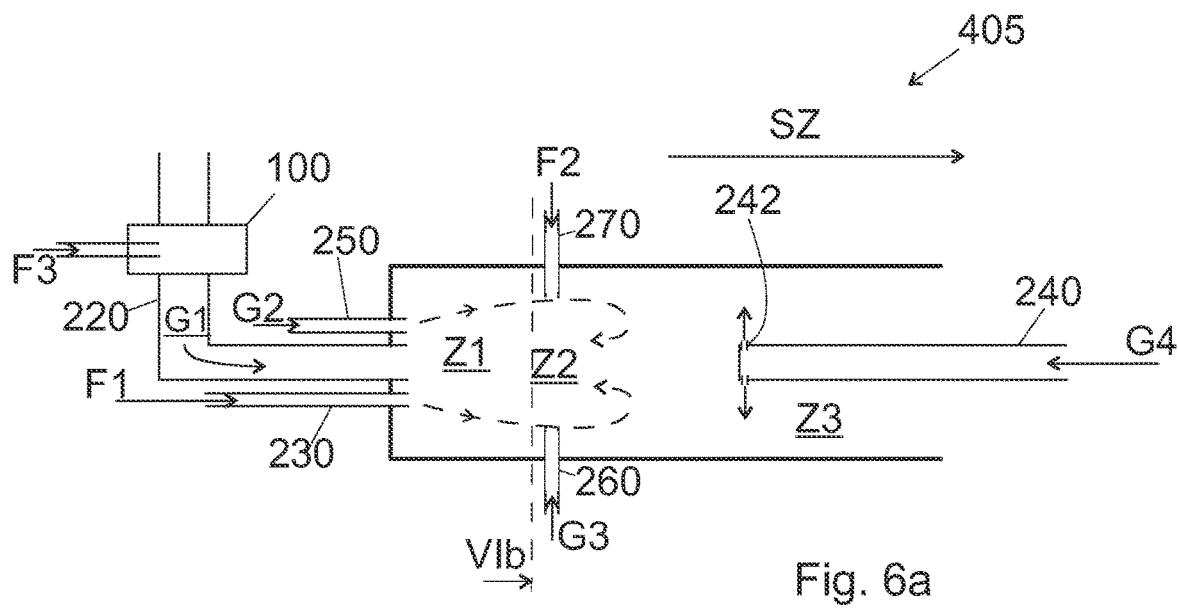
FIG. 6b shows, in an end view, the section VIb of FIG. 6a according to an embodiment.
FIG. 6c shows, in an end view, the section VIb of FIG. 6a according to another embodiment.
Figure 6B:
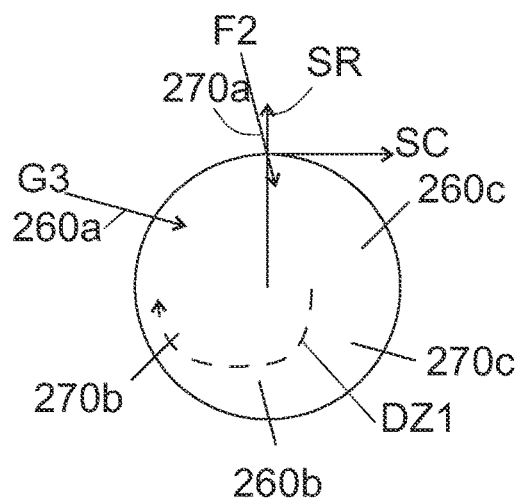
Figure 6C:
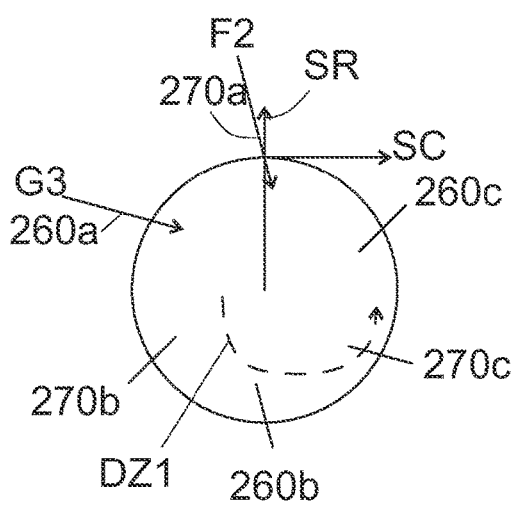

In FIG. 4b, the primary pipeline 220 is arranged co-centric with the furnace 200. Moreover, the secondary pipeline 250 is arranged co-centric with the furnace 200. The secondary pipeline 250 laterally surrounds the primary pipeline 220. In between these pipelines, the secondary combustion gas G2 is configured to flow (see FIG. 4a). Two guide elements 222 are arranged in between the pipelines 220, 250. As is evident, one guide element 222 could suffice, or more guide elements could be used. The guide elements 222 form a thread within the space limited by the pipelines 220, 250. By having such guide elements 222, the direction flow of the secondary combustion gas G2 is neither longitudinal (parallel to SZ), radial (parallel to SR), nor parallel to any their linear combination. Correspondingly, the direction of the flow of the secondary combustion gas G2 within the primary process zone has a component that is perpendicular to the longitudinal direction SZ and perpendicular to the radial direction SR, as detailed above. In general, a direction that is perpendicular to the longitudinal direction SZ and perpendicular to the radial direction SR is called a circumferential direction SC (see FIG. 4b). For example, the guide elements 222 of FIGS. 4a and 5a are configured to guide the flow in a clockwise circumferential direction SC, as indicated in FIG. 6b by a dotted line. In the alternative, the guide elements 222 could be configured to guide the flow in an anti-clockwise circumferential direction −SC, as indicated in FIG. 6c by a dotted line.

Figure 5B:
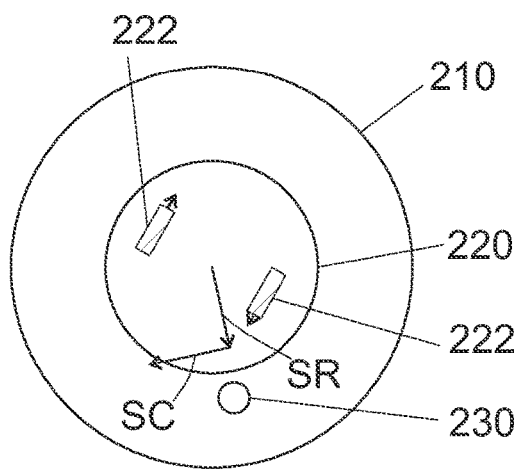

Similar effect could be achieved, if the secondary combustion gas G2 would be fed within the innermost pipeline and the primary combustion gas would be fed by a pipeline surrounding it (not shown). Moreover, the secondary combustion gas G2 is not necessarily needed. Referring to FIGS. 5a and 5b, a guide element 222 (or elements) can be provided within the primary pipeline 220 or at an end of the primary pipeline 220, to guide the flow of the primary combustion gas G1. The guide element 222 may be a baffle plate configured to guide the flow of the combustion gas G1, G2, as indicated in FIG. 4b. The guide element 222 may be a nozzle configured to guide the flow of the combustion gas G1, G2, as indicated in FIG. 5b. For example, the nozzle 221 (FIG. 1) may serve as the guide element 222 (FIG. 5b).

Preferably a guide element 222 is provided in the secondary pipeline 250, which is configured to convey the secondary combustion gas G2, because the temperature of the secondary combustion gas is low. Thus, the material requirements, in terms of heat resistance, for the guide element 222 are not as high as they would be if the guide element 222 was placed in the primary pipeline 220.

It has been observed that having such a flow within the primary process zone Z1 has the effect that, at some longitudinal point, the flow turns. The flow turns in such a way that after flowing at an outer part of the furnace 200 in a positive longitudinal direction +SZ, the flow turns towards an inner part of the furnace 200 such that thereafter, in the inner part of the furnace 200 the direction of the flow has a component in the negative longitudinal direction −SZ. Such turning is indicated by dotted lines in FIGS. 4a, 5a, and 6a. It has been observed that such a profile of the flow increases the reaction time available for the primary fuel F1 within the primary (and/or secondary) process zone Z1 (and/or Z2). This since the air-fuel equivalence ratio within the primary and secondary process zones Z1 and Z2 is sub-stoichiometric, this increases the production of $N_2$ instead of NOx.

If secondary fuel F2 and/or tertiary combustion gas G3 is/are fed to the secondary process zone Z2, this phenomenon can be enhanced by feeding the secondary fuel F2 and/or the tertiary combustion gas G3 into the secondary process zone Z2 such that it/they are injected in a direction that has a component in the same circumferential direction as the flow in the primary process zone Z1. However, depending on details of the case, it may be feasible to feed the secondary fuel F2 and/or the tertiary combustion gas G3 to the secondary process zone Z2 such that the tangential component of the flow of this/these material at an outlet of the pipeline (260, 270) is co-oriented or reverse to the tangential component of the intermediate combustion products in the secondary process zone. As a further alternative, the secondary fuel F2 and/or the tertiary combustion gas G3 may be fed to the secondary process zone Z2 in a radial direction.

Referring to FIG. 6b, the secondary fuel F2 may be fed to the secondary process zone Z2 via multiple second pipelines 270a, 270b, 270c. The second pipelines 270a, 270b, 270c may be equipped with nozzles. The tertiary combustion gas G3 may be fed to the secondary process zone Z2 via multiple tertiary pipelines 260a, 260b, 260c. The tertiary pipelines 260a, 260b, 260c may be equipped with nozzles. In an embodiment, the second pipeline 270 (or 270a, 270b, 270c) is configured to feed the second fuel F2 into the second process zone Z2 in a direction that has a component in a circumferential direction SC. In an embodiment, the tertiary pipeline 260 (or 260a, 260b, 260c) is configured to feed the tertiary combustion gas G3 into the second process zone Z2 in a direction that has a component in a circumferential direction SC. Even if not shown in FIG. 6b, the second pipelines 270a, 270b, 270c may be co-axial with the tertiary pipelines 260a, 260b, 260c, as indicated in FIG. 5c, even if the direction of the pipelines is not radial.

Referring to FIG. 6b, in an embodiment, [A] the apparatus 405 comprises a guide element 222 configured to guide a gas flow into the primary process zone Z1 such that the direction of the gas flow within the primary process zone has a positive component in a circumferential direction SC and [B,i] the second pipeline 270 (or 270a, 270b, 270c) is configured to feed the second fuel F2 into the second process zone Z2 in a direction that has a positive component in the circumferential direction SC and/or [B,ii] the tertiary pipeline 260 (or 260a, 260b, 260c) is configured to feed the tertiary combustion gas G3 into the second process zone Z2 in a direction that has a positive component in the circumferential direction SC. Such an embodiment is depicted in FIG. 6b, wherein the dotted line DZ1 indicates the direction of flow within the primary zone Z1 as obtainable e.g. with the embodiment of FIG. 4b or FIG. 5b.

Referring to FIG. 6c, in an alternative embodiment, [A] the apparatus 405 comprises a guide element 222 configured to guide a gas flow into the primary process zone Z1 such that the direction of the gas flow within the primary process zone has a negative component in a circumferential direction SC and [B,i] the second pipeline 270 (or 270a, 270b, 270c) is configured to feed the second fuel F2 into the second process zone Z2 in a direction that has a positive component in the circumferential direction SC and/or [B,ii] the tertiary pipeline 260 (or 260a, 260b, 260c) is configured to feed the tertiary combustion gas G3 into the second process zone Z2 in a direction that has a positive component in the circumferential direction SC. Such an embodiment is depicted in FIG. 6c, wherein the dotted line DZ1 indicates the direction of flow within the primary zone Z1 as obtainable e.g. with the embodiment of FIG. 4b or FIG. 5b.

Figure 5C:
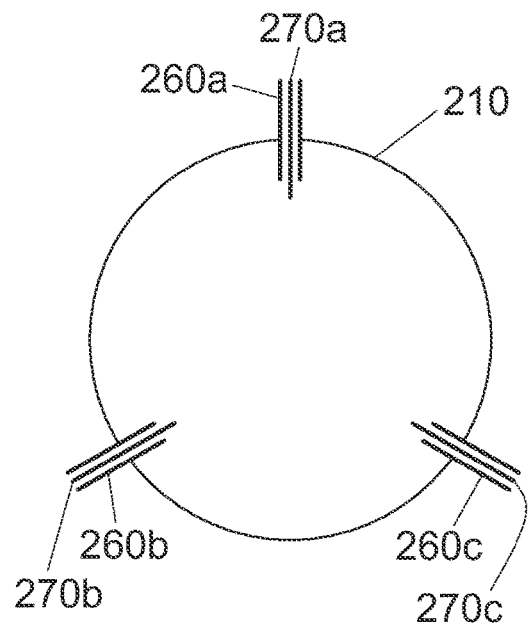

Referring to FIG. 5c, when both the tertiary combustion gas G3 and the second fuel F2 are fed, they may be fed using co-axial pipes. FIG. 5c illustrates an embodiment, in which the second fuel F2 is fed with inner pipes 270a, 270b, and 270c. Moreover, the tertiary combustion gas G3 is fed with outer pipes 260a, 260b, and 260c. As indicated in the figure, each one of the outer pipes 260a, 260b, and 260c surrounds laterally an inner pipe 270a, 270b, and 270c. Moreover, as indicated in FIG. 5c, in an embodiment, the tertiary combustion gas G3 and the second fuel F2 are fed in a radial direction (i.e. direction that is parallel to SR). The tertiary combustion gas G3 may be fed in the radial direction even if secondary fuel F2 is not used at all. The tertiary combustion gas G3 and/or the secondary fuel F2 may be fed in the radial direction even if co-axial pipes are not used. Co-axial pipes may be used in the aforementioned embodiments, wherein the tertiary combustion gas G3 and secondary fuel F2 are fed, but they are not fed in the radial direction SR.

Figure 7:
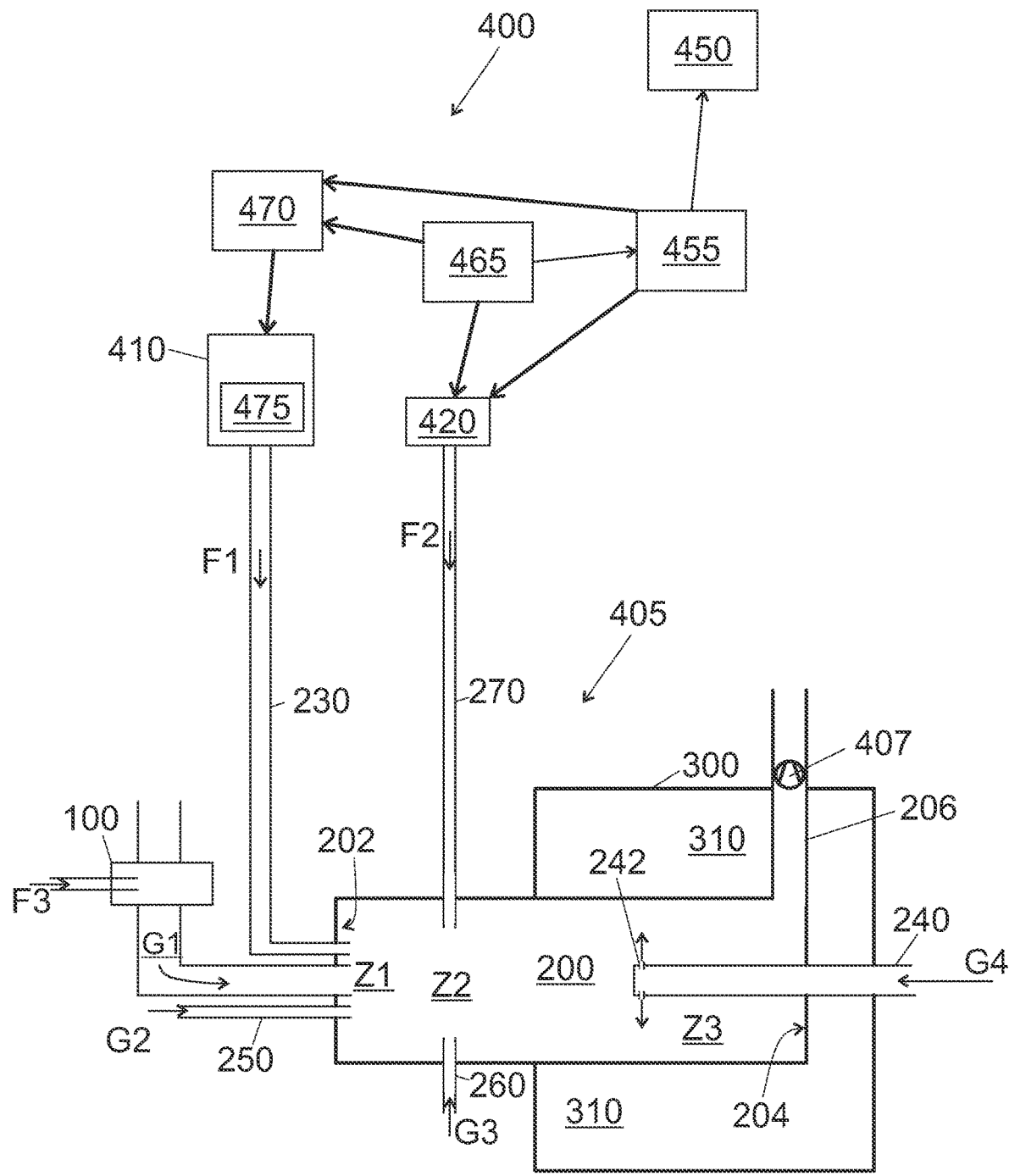
FIG. 7 shows a pulp mill having an apparatus for burning primary fuel.
Figure 8:
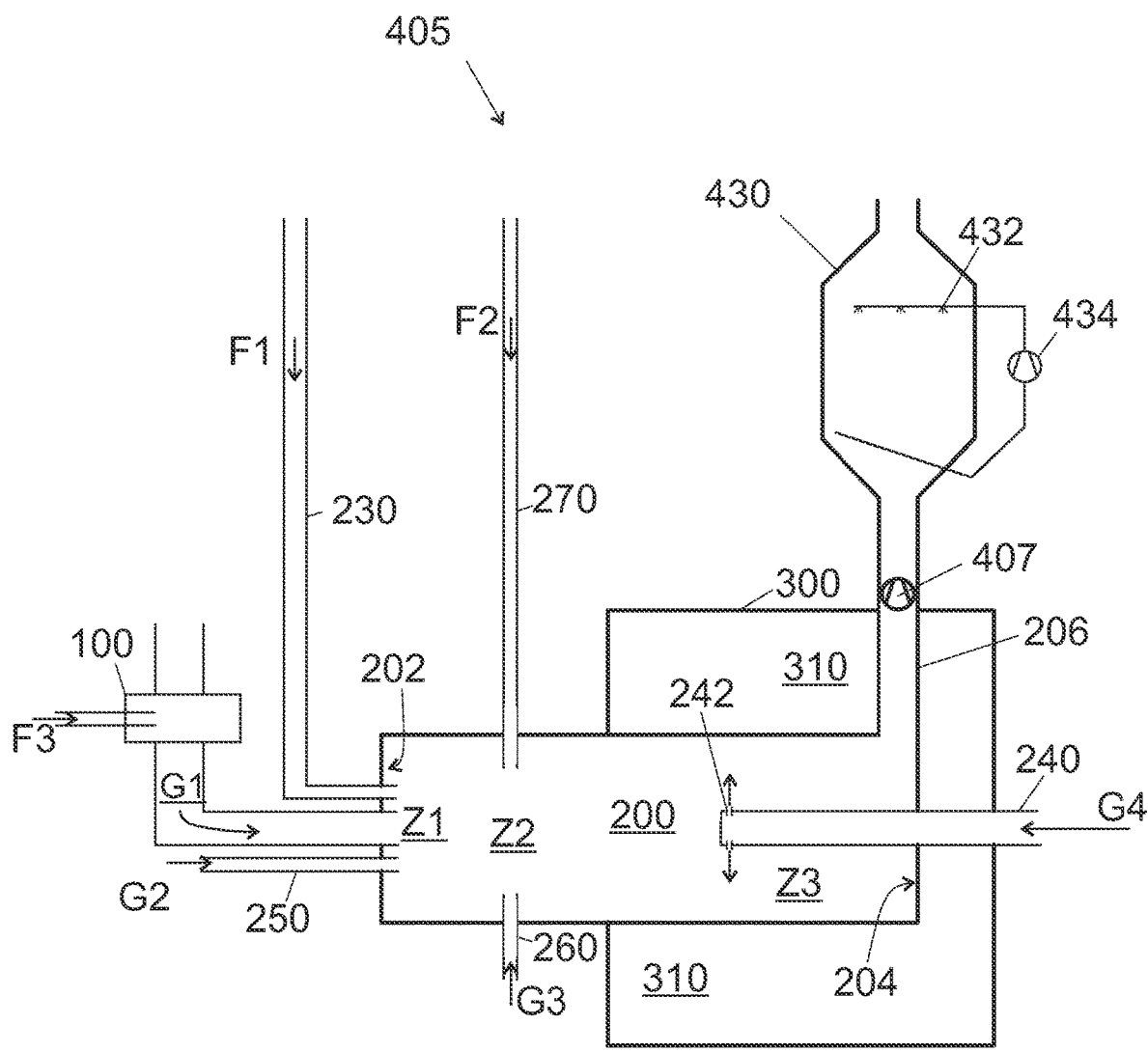
FIG. 8 shows in a side view, an embodiment of a method for burning nitrogen-containing fuels, and a corresponding apparatus.

Referring to FIGS. 5a, 7, and 8, an embodiment comprises a fan or a pump 407 placed in the a flue gas channel 206. The fan or the pump 407 is configured to generate an underpressure into the furnace 200. The underpressure is lower than the pressure of the ambient. The pressure in the furnace 200 may be e.g. 1 kPa-2 kPa lower than the ambient pressure. This has the effect that in case of malfunction, the primary fuel F1 and/or the secondary fuel F2 is sucked into the furnace 200 by the underpressure. This ensures that the fuel(s) F1 and/or F2 are not expelled to atmosphere without oxidizing them.

Benefits of the embodiments as disclosed above include:
Size. The apparatus is small, because it does not need massive thick walls for storing heat. The heat is produced by a combustion gas heater 100.
Size. The apparatus is cheap to manufacture, because it does not need massive thick walls for storing heat. The combustion gas heater 100 is reasonably simple and cheap component.
Simplicity. The presented process is easy to control.
Short set-up time. The combustion gas heater may produce sufficiently hot primary combustion gas G1 reasonable rapidly.
Maintenance costs. Since the apparatus is simple and small, also its maintenance is easier and thus cheaper.
Reliability in terms of thermal load and thermal shocks. Since the wall 210 is a metal wall, of which at least a part is immersed in liquid heat transfer medium, the heat resistance of the furnace is improved.
Possibility of optimizing X. Since the wall 210 is cooled, excess amounts of combustion gases are not needed to cool the apparatus. Thus, the amounts of combustion gases may be optimized in view of low NOx emissions and oxidization of Sulphur.
Soot removal. Because of the simple structure of the apparatus, soot can be easily removed from the surfaces of the furnace 200.

The apparatus 405 is preferably installed as a part of a pulp mill 400. Referring to FIG. 7, a pulp mill 400 comprises the apparatus 405. As is evident, any embodiment of the apparatus 405 as discussed above or below is suitable for use with combination of other parts of the pulp mill 400. In general, a pulp mill further comprises e.g. a chemical recovery device 450, an evaporator area 455, a digester area 465, and a stripper 470. One or more evaporators are arranged at the evaporator area 455. One or more digesters are arranged at the digester area 465. The stripper 470 is typically configured to strip foul condensates resulting from evaporator(s) (i.e. from the evaporator area 455) and/or digester(s) (i.e. from the digester area 465). As indicated above, stripper off gas is produced in the stripper 470, and such gas may be condensed to obtain methanol. Thus, a system may comprise a condenser 475 for condensing stripper off gas to produce methanol. The chemical recovery device 450 may be e.g.

a recovery boiler of a sulfite process, configured to burn concentrated brown liquor or
a chemical recovery boiler of a Kraft process, configured to burn concentrated black liquor.

The pulp mill 400 further comprises a first collector 410 configured to collect SOG (stripper off gas) from the stripper 470, and optionally condense it to methanol. Thus, the condenser 475 may form a part of the first collector 410. An embodiment of the pulp mill 400 further comprises a second collector 420 configured to collect, from other parts of the pulp mill, such as the evaporator area 455 and/or the digester area 465 concentrated non-condensable odorous gas (CNCG).

In an embodiment, the first pipeline 230 extends from the apparatus 405 to the first collector 410 or the second collector 420. Correspondingly, the first pipeline 230 is configured to convey the primary fuel F1 from the first collector 410 or the second collector 420 to the primary process zone Z1 (not shown in FIG. 7). In such an embodiment, the primary fuel comprises strong odorous gas and/or its condensate. Preferably, the first pipeline 230 extends from the apparatus 405 to the first collector 410, as indicated in FIG. 7. Correspondingly, the first pipeline 230 is configured to convey the primary fuel F1 from the first collector 410 to the primary process zone Z1. In such an embodiment, the primary fuel F1 comprises SOG and/or its condensate.

In an embodiment, the second pipeline 270 extends from the apparatus 405 to the second collector 420. Correspondingly, the second pipeline 270 is configured to convey the secondary fuel F2 from the second collector 420 to the secondary process zone Z2. In such an embodiment, the secondary fuel F2 comprises CNCG.

Therefore, an embodiment comprises collecting the primary fuel F1 from a pulp process. An embodiment comprises collecting the primary fuel F1 from at least the stripper 470. An embodiment comprises collecting the primary fuel F1 from at least one of (i) the evaporator area 455, to which at least one evaporator has been arranged and (ii) the digester area 465, to which at least one digester has been arranged. The primary fuel F1 may be collected from all the three aforementioned locations. An embodiment comprises collecting the primary fuel F1 from the stripper 470 and collecting the secondary fuel F2 from at least one of (i) the evaporator area 455, to which at least one evaporator has been arranged and (ii) the digester area 465, to which at least one digester has been arranged.

As indicated above, in the method, the Sulphur is oxidized to $SO_2$ and/or $SO_3$. Referring to FIG. 8, in an embodiment, the flue gases from the furnace 200 are conveyed to humidifier 430. The humidifier 430 is configured to contact the flue gas from the furnace 200 with an aqueous solution. The humidifier 430 comprises a pump 434 configured to circulate an aqueous solution. The humidifier 430 further comprises nozzles 432 for spraying the aqueous solution to the flue gases expelled from the furnace 200.

As a first example, the humidifier 430 may be a scrubber 430 for scrubbing the Sulphur oxides from the flue gases. In such a case, the aqueous solution sprayed to the flue gases may be alkaline. Having an alkaline scrubbing solution improves the scrubbing of the sodium oxides. The humidifier 430 may further comprise a storage for storing alkaline, e.g. some hydroxide (NaOH, KOH).

As a second example, the humidifier 430 may be a condensation tower 430 for producing sulfuric acid. In such a case, a catalytic converter (not shown) may be used to oxidize $SO_2$ of the flue gases to $SO_3$, which, when contacted with the aqueous solution, will react with water and form sulfuric acid. In such an embodiment, the aqueous solution may be dilute sulfuric acid.

The invention claimed is:

1. A method for burning primary fuel, the method comprising:
producing primary combustion gas having an oxygen content from 7 vol % to 19 vol % by burning a tertiary fuel,
feeding the primary fuel and the primary combustion gas to a primary process zone of a furnace,
feeding tertiary combustion gas to a secondary process zone of the furnace,
letting at least one of the primary fuel, the primary combustion gas, or their reaction products move from the primary process zone via the secondary process zone to a tertiary process zone of the furnace,
feeding quaternary combustion gas comprising oxygen to the tertiary process zone of the furnace, producing such primary combustion gas that has a temperature of at least 450° C., and delivering the primary combustion gas to the primary process zone by means of a compressor or a fan, wherein the primary fuel comprises ammonia ($NH_3$) and methyl mercaptan ($CH_3SH$).

2. The method of claim 1, wherein an oxygen content of the quaternary combustion gas is higher than an oxygen content of the primary combustion gas.

3. The method of claim 1, further comprising feeding secondary combustion gas to the primary process zone of the furnace.

4. The method of claim 3, wherein an oxygen content of the secondary combustion gas is higher than an oxygen content of the primary combustion gas.

5. The method of any of claim 1, wherein at least a part of the furnace is surrounded by at least a wall that is arranged in a container at least partially filled with liquid heat transfer medium such as oil or water.

6. The method of claim 1, further comprising feeding secondary fuel to the secondary process zone of the furnace.

7. The method of claim 6, wherein either:
the secondary fuel comprises at least a compound containing nitrogen; or
the secondary fuel comprises at least a compound containing nitrogen such that a nitrogen content of the secondary fuel is less than a nitrogen content of the primary fuel.

8. The method of claim 1, wherein:
a concentration of the methyl mercaptan in the primary fuel is at least 20000 ppm; or
a concentration of the methyl mercaptan in the primary fuel is at least 20000 ppm and a concentration of the ammonia is at least 1000 ppm on dry basis.

9. The method of claim 1, comprising controlling an amount of the primary combustion gas and an amount of the primary fuel in such a way that an air-fuel equivalence ratio at the primary process zone is at most 0.95.

10. The method of claim 1, comprising controlling an amount of the primary combustion gas and an amount of the primary fuel in such a way that an air-fuel equivalence ratio at the primary process zone is less than 0.8.

11. The method of claim 1, further comprising controlling an amount of the quaternary combustion gas in such a way that an air-fuel equivalence ratio at the tertiary process zone is more than 1.1.

12. The method of claim 1, further comprising either:
collecting the primary fuel from a pulp process; or
collecting the primary fuel and secondary fuel from the pulp process with the secondary fuel being fed to the secondary process zone of the furnace.

13. The method of claim 1, further comprising providing mechanical energy to the compressor or the fan by means of a turbine.

14. A pulp mill comprising:
an apparatus for burning primary fuel, the apparatus comprising:
a furnace limited by at least a wall, the furnace having a primary process zone, a tertiary process zone, and a secondary process zone arranged in between the primary process zone and the tertiary process zone,
a combustion gas heater comprising a secondary furnace configured to burn tertiary fuel to produce primary combustion gas,
a primary pipeline for conveying primary combustion gas from the combustion gas heater to the primary process zone,
a first pipeline for conveying primary fuel to the primary process zone,
a tertiary pipeline for conveying tertiary combustion gas to the secondary process zone, and
a quaternary pipeline for conveying quaternary combustion gas to the tertiary process zone,
wherein the combustion gas heater is configured to form primary combustion gas having a temperature of at least 450° C. and the combustion gas heater comprises a compressor or a fan configured to drive primary combustion gas to the furnace; and
at least one of:
(i) an evaporator area to which at least one evaporator has been arranged,
(ii) a digester area to which at least one digester has been arranged, and
(iii) a stripper, and
a collector configured to collect strong odorous gas, such as stripper off gas from the stripper and/or concentrated non-condensable odorous gas from the evaporator area and/or the digester area,
wherein the first pipeline extends from the apparatus to the collector.

15. The pulp mill of claim 14, wherein:
the collector is a first collector configured to collect stripper off gas from the stripper and the first pipeline extends from the apparatus to the first collector; and
the system comprises a second collector configured to collect concentrated non-condensable odorous gas from the evaporator area and/or the digester area, wherein a second pipeline extends from the apparatus to the second collector and the second pipeline is configured to convey secondary fuel to the secondary process zone.

16. The pulp mill of claim 14, further comprising a secondary pipeline for conveying secondary combustion gas to the primary process zone.

17. Pulp mill of claim 14, further comprising a second pipeline for conveying secondary fuel to the secondary process zone.

18. A method for burning primary fuel, wherein the primary fuel comprises at least a first compound containing nitrogen and a second compound comprising sulfur, the method comprising:
producing primary combustion gas having an oxygen content from 7 vol % to 19 vol % by burning a tertiary fuel,
feeding the primary fuel and the primary combustion gas to a primary process zone of a furnace,
feeding tertiary combustion gas to a secondary process zone of the furnace,
letting at least one of the primary fuel, the primary combustion gas, or their reaction products move from the primary process zone via the secondary process zone to a tertiary process zone of the furnace,
feeding quaternary combustion gas comprising oxygen to the tertiary process zone of the furnace,
producing such primary combustion gas that has a temperature of at least 450° C.,
delivering the primary combustion gas to the primary process zone by means of a compressor or a fan, and
controlling an amount of the quaternary combustion gas in such a way that an air-fuel equivalence ratio at the tertiary process zone is more than 1.1.

19. The method of claim 18, further comprising feeding secondary combustion gas to the primary process zone of the furnace.

20. The method of claim 19, wherein an oxygen content of the secondary combustion gas is higher than an oxygen content of the primary combustion gas.

21. The method of claim 18, further comprising feeding secondary fuel to the secondary process zone of the furnace.

22. The method of claim 18, comprising controlling an amount of the primary combustion gas and an amount of the primary fuel in such a way that an air-fuel equivalence ratio at the primary process zone is at most 0.95.

23. The method of claim 18, comprising controlling an amount of the primary combustion gas and an amount of the primary fuel in such a way that an air-fuel equivalence ratio at the primary process zone is less than 0.8.

\* \* \* \* \*